United States Patent [19]

Geary

[11] 3,780,297

[45] Dec. 18, 1973

[54] CONVEYOR SPEED MONITOR
[75] Inventor: Fred Geary, Holland, Mich.
[73] Assignee: U.S. Industries, Inc., New York, N.Y.
[22] Filed: Oct. 4, 1971
[21] Appl. No.: 186,137

[52] U.S. Cl.......... 250/231 R, 250/223 R, 250/206, 250/233
[51] Int. Cl. ............................................. G01d 5/34
[58] Field of Search.................... 250/231, 219 FR, 250/219 DR, 206, 223 R, 223 B, 233

[56] References Cited
UNITED STATES PATENTS

| | | | |
|---|---|---|---|
| 3,408,500 | 10/1968 | Carr............................. | 250/233 X |
| 3,362,600 | 1/1968 | Rietema et al............. | 250/219 FR X |
| 3,392,284 | 7/1968 | Cain............................. | 250/206 X |
| 3,524,067 | 8/1970 | West............................. | 250/231 X |
| 3,343,043 | 9/1967 | Ito et al........................ | 250/206 X |

*Primary Examiner*—Walter Stolwein
*Attorney*—Price, Heneveld, Huizenga & Cooper

[57] ABSTRACT

Light chopping means are coupled to a conveyor belt such that as the speed of the conveyor belt varies, a light path between a source of light and a photoresistance cell is interrupted at a frequency directly related to the conveyor belt speed. The photo cell is coupled in an electrical circuit for detecting speed variations by detecting the resulting frequency variations of the light pulses. The electrical circuit provides an indicating signal when the speed of the conveyor belt reaches a predetermined level and also develops a control signal which can be employed for automatically regulating drive apparatus or other equipment associated with the conveyor system.

20 Claims, 6 Drawing Figures

PATENTED DEC 18 1973 3,780,297

CONVEYOR SPEED MONITOR

BACKGROUND OF THE INVENTION

The present invention relates to a conveyor speed monitor circuit for providing an indication when a conveyor belt reaches a predetermined speed.

In many applications, whereby a conveyor belt is employed to move items along an assembly or packaging line, if the conveyor belt speed varies undesirably by, for example, slowing down; the uniform flow of items can be adversely affected. They may, for example, back up at one end of the conveyor where they are being fed to the conveyor at a predetermined rate related to the proper conveyor belt speed, or they will not be available in time for further manufacturing processes or packaging at the downstream end of the conveyor. Thus, the conveyor system could become jammed or inefficiently utilized.

An example of the difficulty encountered when a conveyor belt slows down is in the egg packaging area where eggs are fed onto a conveyor belt at a predetermined rate. If the conveyor belt undesirably slows down for one reason or another, eggs may be backed up at one or more locations on the conveyor line and stack up and bump into one another such that the shells fracture causing a predictable inconvenience, loss, and delay in time. Thus, it is necessary to have an employee continuously monitor the conveyor and egg loading process such that if a conveyor slowdown does occur, appropriate corrective action can be taken. By employing the automatic conveyor speed monitoring system of the present invention, however, it is not necessary to have an employee continually watch the conveyor since an electrical circuit will automatically monitor the conveyor speed and provide either a visual or audible alarm, or a control signal which can be directly applied to control apparatus to stop the production or packaging line in the event the conveyor speed falls below a predetermined level.

An additional feature of a monitor embodying the present invention is that it can be employed to provide an alarm signal for a conveyor which operates at different speeds during use. This is accomplished by recalibrating the monitor as the operational speed of the conveyor is changed.

It is an object of the present invention to provide a conveyor speed monitor which produces a visual alarm when the conveyor slows to a predetermined speed;

it is a further object of the present invention to provide a conveyor speed monitor unit which is easily calibrated for use with conveyors having different operational speeds;

it is an additional object of the present invention to provide a monitor unit which produces an electrical control signal which can be employed to control conveyor apparatus in a desired manner in the event of an undesired conveyor speed variation; and it is a further object of the present invention to provide an electrical circuit for detecting the conveyor speed in combination with speed indicating means mechanically coupled to the conveyor.

SUMMARY OF THE INVENTION

Apparatus embodying the present invention includes means coupled to a moving object for providing signals whose frequency is related to the speed of the moving object. Detecting means are provided for sensing changes in the frequency of the signals and for providing an electrical signal therefrom. Indicating means are coupled to the detecting means and are responsive to the electrical signals therefrom to provide a control signal which indicates the moving object has reached a predetermined speed. When employed with a conveyor for transporting eggs, the apparatus monitors the conveyor belt speed and provides an alarm or control signal if a conveyor slowdown occurs.

DETAILED DESCRIPTION OF THE PREFERRED EMBODIMENT

Figure 3:
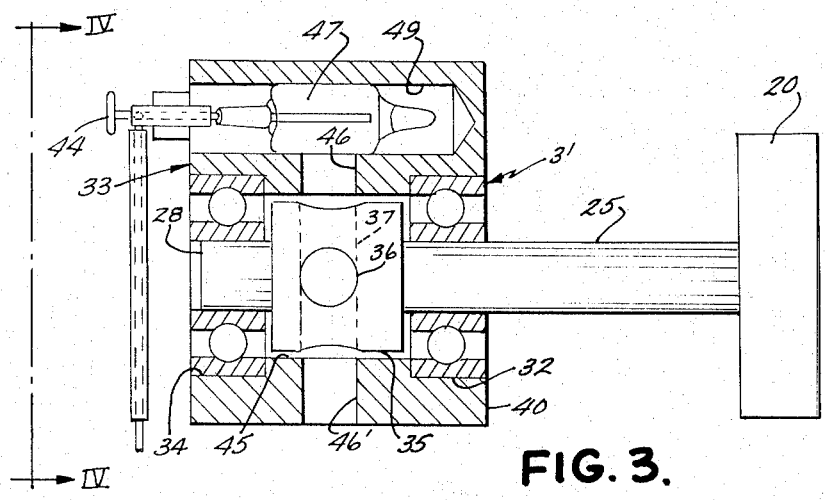
FIG. 3 is a cutaway side view showing the details of a bearing block assembly employed in the monitor unit.
Figure 4:
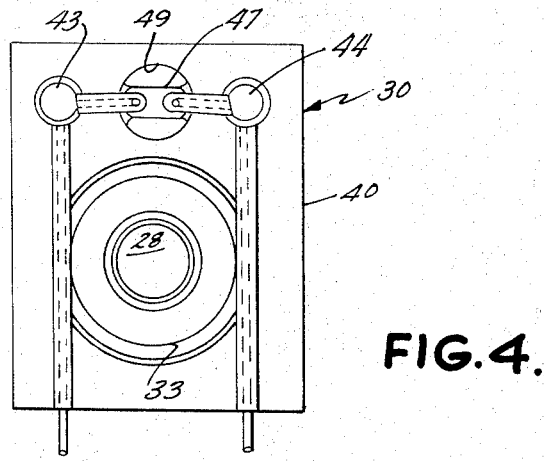
FIG. 4 is an end view of the bearing block assembly shown in FIG. 3 taken along the lines IV—IV shown in FIG. 3.

A monitor unit 10 (FIGS. 1 and 2) includes a chassis box 12 having a removable cover 13. Extending from the chassis box is a wheel 20 mounted on a shaft 25 (FIG. 3) which extends into a bearing block assembly 30 shown in FIGS. 3 and 4. The monitor unit 10 includes a lens 14 for a malfunction indicating light, an aperture 16 for viewing a neon bulb contained in the electrical circuit thereof, a second aperture 17 for providing an adjustment to circuit means contained in the monitor 10. An electrical cable 18 for providing power to the unit and for coupling electrical signals from the unit, and a two-position electrical switch arm 19 which has calibration and operating positions are also included.

The monitor 10 is mounted on a side plate 21 (FIG. 2) of a conveyor assembly unit 22 such that the wheel 20 of the monitor unit passes through an opening in the side plate (not shown) and will contact a movable conveyor belt 24 to be rotated thereby. A wheel guard 23 prevents items traveling on the conveyor belt from jamming against the wheel and shaft portions of the monitor unit. The conveyor assembly 22 may further include a second side plate 26 for confining items such as eggs 27 traveling on the conveyor belt.

Figure 2:
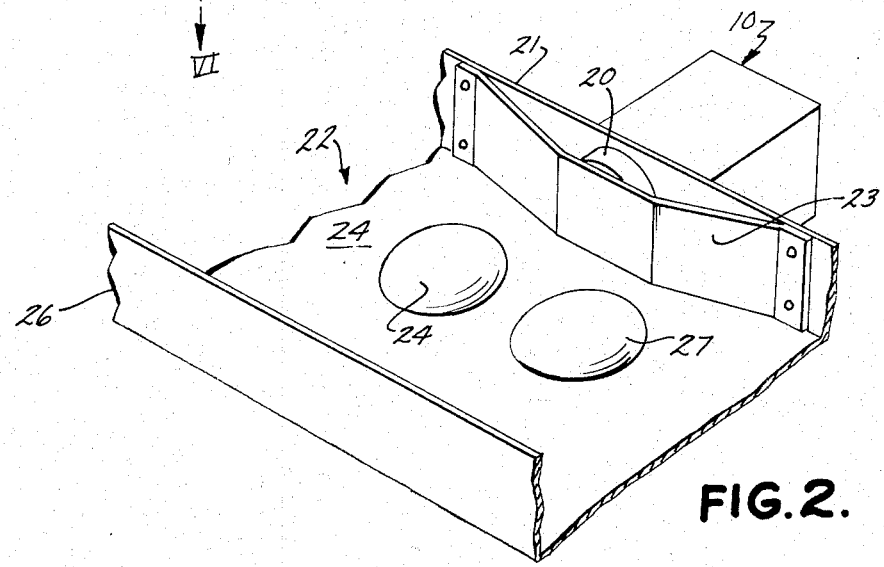
FIG. 2 is a fragmentary perspective view of the monitor unit installed on an egg conveyor assembly.

The wheel 20 of the monitor unit 10 is mounted at the right end of shaft 25 (FIG. 3) and as noted above, is rotated by the motion of the conveyor belt which contacts the wheel 20. The shaft 25 is attached to a spool 35 including apertures 36 and 37 transversely drilled through the spool in orthogonal relationship to one another. The spool 35 is mounted in a chamber 45 located in a housing 40 of the bearing block assembly 30. A first bearing 31 is press fit into an associated annular opening 32 in housing 40. This bearing supports shaft 25 which extends through the bearing and into the spool 35. A second shaft 28 is mounted to the spool 35 in axial alignment with shaft 25 but at the opposite end of the spool. A second bearing 33 is press fit into a second annular opening 34 in housing 40 and supports the second shaft 28 which extends therethrough. The assembly thus far described allows the spool having apertures 36 and 37 extending therethrough to rotate in chamber 45 as shaft 25 is driven by the wheel 20 by virtue of the contact of the wheel 20 to the conveyor belt 24 as shown in FIG. 2. Shafts 25 and 28 can be integrally formed with the spool 35 from one piece of stock material.

A bearing block assembly 30 further includes provisions in the housing 40 for mounting a light source such as a neon bulb 47. Terminals 43 and 44 are provided on the housing 40 (FIG. 4) to provide electrical connection to the bulb 47. The bulb is fitted in an appropriately sized hole 49 drilled partially through the bearing block housing 40. The hole is sufficiently deep so as to allow the portion of the light 47 from which light is emitted to be centered about a second aperture 46 which extends through the upper portion of the housing assembly 40 from aperture 49 into chamber 45. An extension 46 of aperture 46 aligns with the aperture 46 and extends through the lower portion of the housing 40. Apertures 46–46' are aligned such that a light path exists from the light source 47 down through the apertures 46–46' when one or the other of the apertures 36 and 37 of spool 35 are in alignment with aperture 46 during the rotation of shaft 25 and spool 35.

It is seen, therefore, that if a light sensing device such as a photocell is mounted in or near aperture 46', pulses of light would be detected by the sensing means as the shaft 25 is rotated since the apertures 36 and 37 in spool 35 will pass light from the light source 47 to the sensor only when they are in alignment. Thus, the rotating spool will act as light chopper. The frequency of chopped light therefrom will vary as the conveyor belt speed varies, thereby varying the rotational velocity of the shaft 25. Appropriate electrical circuit means can be employed to detect the changing frequency of the light pulses as detected by the conveyor, or provide a signal when the conveyor speed has reached a predetermined level. Such an electrical circuit arrangement is shown in FIG. 5.

Figure 5:
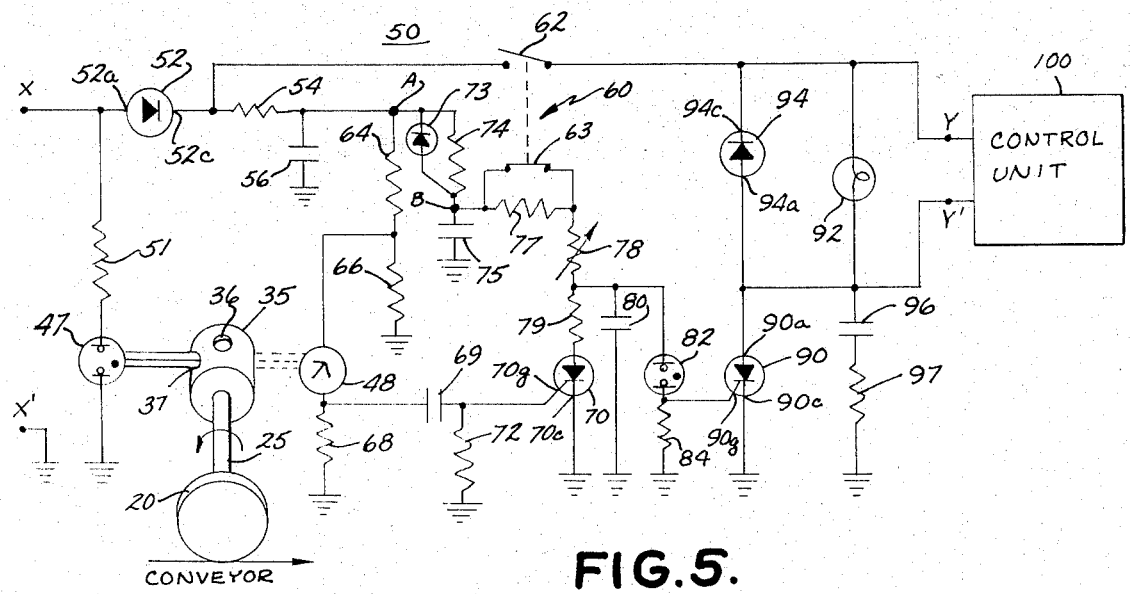
FIG. 5 is a schematic diagram partially in pictoral and block diagram form showing an electrical circuit which is employed in conjunction with the mechanical structure of the monitor unit.

In FIG. 5 there is shown an electrical circuit 50 which is employed to convert the light pulses due to the conveyor motion into electrical signals representative of the speed of operation of the conveyor. Input power to the circuit is applied across terminals X–X' and output signals are applied to terminals Y–Y'. The power is applied to the light source 47 by means of the series connected resistor 51, the combination being coupled across the terminals at X—X'. The light source 47 will thereby be continuously operative to supply light from its light emitting electrode. A suitable light source with extended lift is a neon type bulb which is activated by the applied line voltage. Input power is likewise applied to a diode 52 having an anode terminal 52a coupled to terminal X and a cathode terminal 52c coupled to an output filter comprising a resistor 54 and a capacitor 56 which filters the pulsating direct current voltage at terminal 52c of the diode and produces at terminal A, a direct current supply voltage. The junction of diode 52 to resistor 54 is coupled to a first switch contacts 62 of a double pole single throw switch 60 which is shown in a calibrate position (that is, switch contacts 62 are open). The terminal on switch contacts 62 remote from the terminal coupled to the junction of diode 52 and resistor 54 is coupled to the output terminal Y.

Terminal A is coupled to terminal X' which may be a common terminal illustrated as ground in the figure, by means of series coupled resistors 64 and 66 coupled from terminal A to ground. The junction of resistor 64 and 66 is coupled to a light sensing means 48 such as a photo-resistance cell. A terminal on the photo-resistance cell remote from the junction of resistor 64 and 66 is coupled to ground by means of a resistor 68. The junction of photo-resistance cell 48 and resistor 68 is coupled to a first voltage responsive switch such as a Silicon Controlled Rectifier (SCR) 70 at a gate terminal 70g on a first SCR 70 by means of a coupling capacitor 69. A resistor 72 is coupled from the gate terminals 70g of SCR 70 to ground. A cathode terminal 70c on SCR 70 is coupled directly to ground.

The voltage at terminal A is further filtered by means of an additional resistance-capacitance circuit comprising a resistor 74 and a capacitor 75 serially coupled in the named order from terminal A to ground. A diode 73 is coupled in parallel with resistor 74 as shown in the figures. The junction of resistor 74 and capacitor 75 is coupled to a second switch contact 63 on the switch 60. The second switch contact 63 is coupled in parallel with a resistor 77 which has an end remote from the junction (terminal B) of resistor 74 and capacitor 75 coupled to an adjustable resistor 78. The opposite end of the adjustable resistor 78 is coupled to an anode terminal 70a of SCR by means of a current limiting resistor 79. A capacitor 80 is coupled in parallel with the combination of resistor 79 and SCR 70. Coupled in parallel with capacitor 80 is a second voltage responsive switch 82, which in the preferred embodiment, is a neon bulb. A resistor 84 is serially coupled to bulb 82, and the series combination (82, 84) is coupled in parallel with capacitor 80. The junction of resistor 84 and neon bulb 82 is directly coupled to a third voltage responsive switch such as an SCR at a gate terminal 90g of SCR 90. An anode terminal 90a of SCR 90 is coupled to the output terminal Y'. An indicating lamp 92 is coupled across terminals Y–Y' and diode 94 is coupled in parallel with indicating lamp 92 such that a cathode terminal 94c of diode 94 is coupled to terminal Y and an anode terminal 94a is coupled from terminal 90a of SCR 90 to terminal 90c of SCR 90. Output terminals Y–Y' are coupled to a control unit 100 which responds to signals across output terminals Y–Y' to provide a desired control function as explained below.

OPERATION

The electrical circuit 50 as described and shown in FIG. 5 operates in the following manner to provide a signal across terminals Y–Y' which lights the indicator lamp 92 as well as provides an output voltage across terminals Y–Y' in the event that the conveyor speed slows a predetermined amount. The switch 60 (shown in the calibrate position) is used to initially set up the circuit such that the indicator light will become activated during operation only when the conveyor speed has decreased a predetermined amount. With switch 60 in the calibrate position as shown, the capacitor 80 will be charged from the voltage from terminal B through only the adjustable resistor 78 since resistor 77 is shorted by contact 63 of switch 60. It is seen, therefore, that the charging time constant for capacitor 80 will be somewhat less (i.e., faster) in the calibrate position than in the operation position whereby switch contact 63 is opened and switch contact 62 is closed. This results since resistor 77 is coupled in series during operation and increases the charging time constant for capacitor 80.

Figure 1:
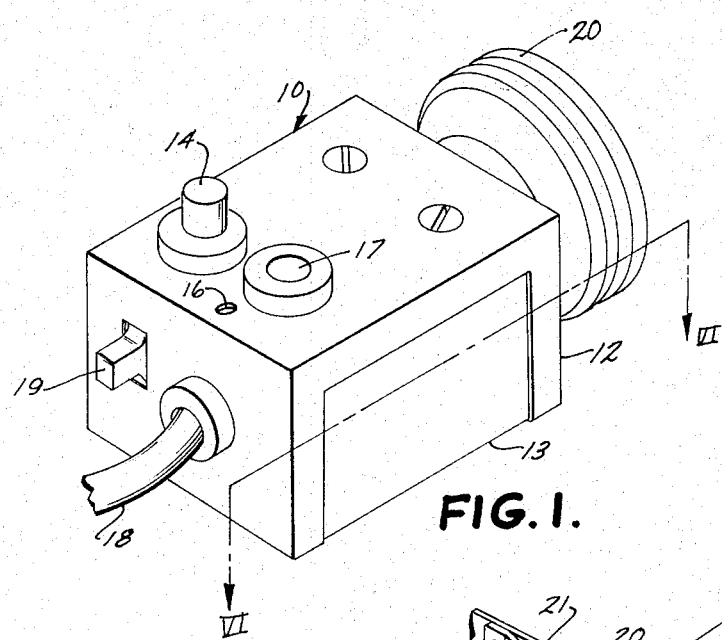
FIG. 1 is a perspective view of the monitor unit.

To calibrate the monitor, the conveyor is brought to the desired operational speed. Pulses of light are thereby supplied to the photo resistance cell 48. As light impinges upon the photo resistance cell 48, the resistance of the cell greatly decreases thereby providing positive polarity electrical pulse signals across resistor 68 which are coupled to the gate 70a of SCR 70 by means of coupling capacitor 69. The SCR 70 will therefore fire and be rendered conductive for each pulse of light which strikes the photo resistance cell. When the SCR 70 fires, it serves to discharge capacitor 80 coupled in parallel thereto since the current limiting resistor 79 has a relatively low value. Thus, capacitor 80 is periodically discharged at a rate which is dependent upon the conveyor speed since the triggering impulses on the gate of 70a of SCR 70 are directly related to the conveyor speed. Since capacitor 80 supplies the operating current for SCR 70, when it discharges the SCR 70 again becomes non-conductive. If for any reason the SCR 70 does not trigger, capacitor 80 will charge to a voltage sufficient to fire the neon bulb 82. This is accomplished by first adjusting resistor 78 so that bulb 82 will repeatedly fire (which can be viewed through the aperture 16 in the monitor unit 10 as shown in FIG. 1), and then adjusting the resistor 78 until the firing of neon bulb 82 just ceases or becomes very infrequent. In one embodiment of the present invention, the monitor was calibrated by running the conveyor at its normal operating speed of 22 feet per minute. The diameter of the wheel which contacted the conveyor was two inches. The resulting pulse frequency of light from the light source through the spool 35 was approximately equal to 2.75 pulses per second. Thus, the SCR 70 fires to discharge capacitor 80 approximately three times per second.

Once the monitor is calibrated, switch 60 is moved to the operating position in which contact 62 is closed and contact 63 is opened. This increases the charging time constant on the capacitor 80 since resistor 77 is now in the charging current path. When the conveyor is running at its normal operating speed (i.e., 22 feet per minute), the SCR 70 will be triggered at a time before the charge on capacitor 80 has reached a voltage sufficient to fire neon bulb 82. Thus, the SCR 90 will not be triggered unless the light pulse frequency is reduced by the conveyor slowing down in speed such that SCR 70 does not trigger in time to prevent the firing of neon bulb 82. The value of resistor 77 can be selected such that a lower speed limit of the conveyor can be preselected. For the parameter values set forth at the end of this specification, a value of 470 kilohms for resistor 77 yielded a speed differential of 6 feet per minute. That is, in the event the conveyor speed slowed from 22 feet per minute to 16 feet per minute, the frequency of the pulse signals applied to the gate 70g of SCR 70 would decrease such that capacitor 80 would not be discharged by the conduction of SCR 70 in time to prevent the neon bulb 82 from firing and therefore developing across resistor 84 a voltage sufficient to trigger SCR 90.

It is seen that with switch 60 in the operating position, contacts 62 are closed and the voltage at the cathode 52c of diode 52 is applied to terminal Y. The voltage at terminal Y' is substantially equal to the voltage at terminal Y before SCR 90 fires since capacitor 96 charges to the voltage at terminal Y through the indicator lamp 92. When, however, the SCR 90 is triggered due to a conveyor slowdown below the preselected limit; the voltage at terminal Y' is reduced to approximately ground potential. SCR 90 will remain conductive until switch 60 is placed in the calibrate position and power is thereby removed from terminal Y. With SCR 90 conductive, the voltage difference between terminal Y which is coupled to diode 52, and terminal Y' which is nearly ground potential, serves to activate indicator lamp 92 which provides a visual signal indicating that the speed of the conveyor has reached the predetermined lower limit. This voltage can likewise be applied to a control unit 100 to provide a variety of corrective control functions to associated equipment in the event the conveyor speed has changed. It is noted that an audible alarm could likewise be coupled across output terminals Y–Y' to provide an additional failure signal. Diode 94 serves to complete a direct current path through a control relay which may be employed in the control unit such that the relay contacts will not chatter. Diode 94 likewise will prevent the anode voltage at terminal Y due to inductive voltage peaks caused by the control unit relay operation and thereby protects the SCR 90 from high-voltage breakover failure.

In some installations the conveyor system will be turned off and then instantly back on. The supply voltage will be removed from terminals X–X' but because of the holding time of capacitor 75, voltage will still be present on capacitor 50 and neon bulb 82 and thus cause neon bulb 82 to fire SCR 90 which may cause an erroneous shutdown of the system. Diode 73 between capacitor 56 and 75 prevents this by maintaining the time delay on turn-on but prevents capacitor 75 from maintaining charge on turn-off. This allows the wheel 20 to come up to speed and apply pulses to SCR 70 before neon bulb 82 can fire when the system is turned on.

Although the preferred embodiment illustrated in FIG. 5 includes an SCR 70 for discharging capacitor 80 and a second SCR 90 for providing a current path which causes the indicator light to become activated and provide an output voltage, it would be possible to utilize other switchable devices such as transistors or the like. Likewise, it is possible to replace the neon bulb 82 with other voltage responsive switching means.

Figure 6:
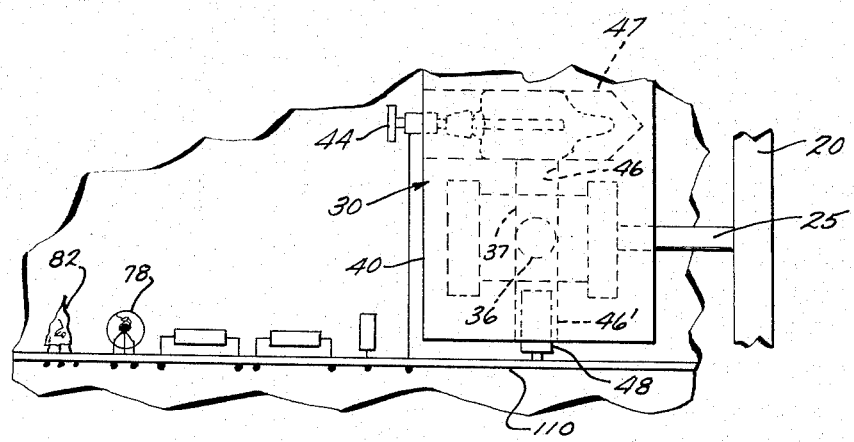
FIG. 6 is a cutaway side view of the monitor unit taken along the section line VI—VI shown in FIG. 1, showing the relative position of the bearing block assembly, chassis box, and electrical circuit components.

The electrical circuit 60, shown in FIG. 5, can be mounted on a printed circuit board 110, shown in FIG. 6. The circuit board 110 is aligned in the chassis box 12 such that the adjustable resistor 78 is aligned with aperture 17 and neon bulb 82 is aligned with aperture 16, as shown in FIG. 1. Likewise, the indicator lamp 92, not shown in FIG. 6, is mounted on the circuit board 110 such that it aligns with the lens 14, shown in FIG. 1. Finally, it is noted that the circuit board is mounted in relation to the bearing block assembly 30 such that the photo-resistance cell 48 will fit into the lower aperture 46' in the housing 40 in a manner such that the light-sensitve surface of the photo-resistance cell 48 is in a position to receive the light pulses from the neon lamp 47, shown in FIGS. 3, 4, 5, and 6.

Although the parameters listed below were employed in a particular embodiment of the present invention, it is possible to vary the parameters for the desired control effect. By varying the resistance of resistor 77, for example, the monitor can detect any predetermined conveyor speed change. It is also possible to modify the circuit such that speed increases could be detected and an indication provided thereof. The following parameters for the electrical circuit shown in FIG. 5 have been successfully employed in one embodiment of the present invention to detect speed variations of approximately 6 feet per minute where the nominal speed of the conveyor was 22 feet per minute.

Resistors
51  33 Kilohms
54  100 Ohms
64  47 Kilohms
66  10 Kilohms
68  27 Kilohms
72  2.7 Kilohms
74  470 Kilohms
77  470 Kilohms
78  3.5 Megohms adjustable
79  47 Ohms
84  150 Ohms
97  100 Ohms Capacitors
56  4 Microfarads
69  20 Microfarads
75  4 Microfarads
80  .22 Microfarads
97  .10 Microfarads SCR
70  General Electric C 103b
90  General Electric C 106b Photo-resistance cell 48 has a resistance value of 3 Kilohms at 2 foot candles and in the present circuit it varied from approximately 5 Megohms with no light impinging upon it to 500 ohms with pulses of light. Neon bulb 82 is a standard type neon bulb with a firing potential of approximately 80 volts. Neon bulb 47 fires between 90 and 105 volts. The indicator light 92 is a standard 120-volt indicator lamp.

The embodiments of the invention in which an exclusive property or privilege is claimed are defined as follows:

1. A speed monitor circuit comprising:
   means for generating electrical signals whose frequency is directly related to the speed of a moving object, said generating means including a continuous source of light and light chopping means, said light chopping means being mechanically coupled to a moving object such that the rate of chopping of said light from said light source is directly related to the speed of said moving object, and a photo-resistance cell whose resistance value varies when light is directed upon a light responsive surface thereof, said cell positioned to receive pulses of light developed by said light chopping means;
   a direct voltage source;
   means coupling said charge storage device to a direct voltage source to charge said device at a selectable rate, and coupling said photo-resistance cell to said source of voltage;
   voltage responsive switch means including a control element coupled to said photo-resistance cell and responsive to signals therefrom to be activated each time a light pulse intercepts said photo-resistance cell thereby completing a conduction path, said switch means coupled to said charge storage device to discharge said device when the conduction path of said switch is completed; and
   circuit means coupled to said charge storage device and actuated by predetermined voltage across the device to provide an output signal when the frequency of signals from said generating means falls below a predetermined value.

2. A circuit as defined in claim 1 wherein said means coupling said charge storage device to said voltage source includes a variable resistance to provide a selectable charging rate of current to said charge storage device.

3. A circuit as defined in claim 2 wherein said circuit means includes a second voltage responsive switch coupled to said charge storage device and responsive to the voltage across said charge storage device when the voltage across said charge storage device reaches said predetermined value to conduct.

4. An electrical circuit as defined in claim 3 wherein said voltage responsive switch comprises a discharge tube coupled in series with an impedance element, the combination coupled in parallel with said charge storage device such that a signal is developed across said impedance element when said discharge tube is activated.

5. An electrical circuit as defined in claim 4 wherein said circuit means includes a third voltage responsive switch having a control element coupled to said impedance element such that said third voltage responsive switch is activated by a signal developed across said impedance element.

6. A circuit as defined in claim 5 and further including: a first output terminal coupled to said source of voltage, and a second output terminal coupled to said third voltage responsive switch such that when said third voltage responsive switch is activated, an output signal is developed across said first and said second output terminals.

7. In a conveyor having a moving conveyor belt, a conveyor speed monitor comprising:
   means coupled to a conveyor for generating light pulses whose frequency is directly related to the speed of the conveyor belt;
   a source of direct voltage;
   means including switch means coupled across a resistor and having a calibration position in which said switch shorts out said resistor and an operating position in which said switch is open for coupling said direct voltage source to a capacitor for charging said capacitor at a first or second selected rate corresponding to calibration and operation of said speed monitor;
   circuit means coupled to said generating means and responsive to said light pulses to provide a periodic discharge current path for said capacitor;
   variable resistance means coupled from said switch means to said capacitor such that when said switch means is in the calibration position to short out said resistor, said variable resistor can be adjusted to maintain the voltage developed across said capacitor below a predetermined level; and
   detecting means coupled to said capacitor and responsive to said predetermined voltage level across said capacitor to develop an output signal when said capacitor is charged to said predetermined voltage level when the conveyor speed decreases below the desired speed and the time interval between the periodic discharging of said capacitor increases to permit said capacitor to be charged to said predetermined voltage.

8. A conveyor speed monitor as defined in claim 7 wherein said means for generating light pulses comprises a source of continuous light and chopping means for chopping light from said source into pulses, said chopping means being mechanically coupled to said conveyor belt such that the pulse frequency of the resulting chopped light is directly related to the speed of said conveyor belt.

9. A monitor as defined in claim 7 wherein said circuit means responsive to said light pulses to provide a periodic discharge current path includes a voltage responsive switch having a control element, light sensitive means for receiving light pulses from said light source, and means coupling said light sensitive means to said control element of said voltage responsive switch such that as a light pulse intercepts said light sensitive means, said voltage responsive switch is activated to conduct and said capacitor.

10. A monitor as defined in claim 7 wherein said detecting means includes a voltage responsive switch coupled to said capacitor whereby said voltage responsive switch is actuated when said capacitor voltage reaches said predetermined level, said second voltage responsive switch coupled in series with a source of voltage and an impedance such that a voltage is developed across said impedance when said voltage responsive switch is actuated.

11. A conveyor speed monitor as defined in claim 10 wherein said detection means further includes an additional voltage responsive switch having a control element coupled to said impedance, said additional voltage responsive switch coupled in series with indicator means, the combination coupled from a voltage source to ground.

12. A monitor as defined in claim 11 wherein there is further included a first output terminal coupled to a first terminal on said indicator means and a second terminal coupled to a second terminal on said indicator means such that an output signal is developed across said output terminals in the event said third voltage responsive switch is actuated.

13. For use in a conveyor system employing a movable conveyor belt, a conveyor belt speed monitor comprising: a housing including a central opening for receiving a spool, a first aperture for receiving a light source, a second aperture spaced across said central opening from said first aperture for receiving a light responsive means, said housing including an additional aperture providing a light path from said first aperture to said second aperture;

a spool rotatably mounted within said central opening and including at least one aperture extending therethrough which aligns momentarily with said second and additional apertures to provide a momentary light path across said central opening as said spool is rotated;

a shaft coupled to said spool and extending from said housing, a wheel mounted to said shaft and external to said housing;

means for mounting said housing to said conveyor such that said wheel contacts the conveyor belt of said conveyor; and circuit means coupled to said light responsive means for generating a control signal in response to light pulses received by said light responsive means.

14. A monitor as defined in claim 13 wherein said housing includes a bearing block assembly for rotatably holding said shaft.

15. A monitor as defined in claim 14 wherein said light responsive means comprises a photo resistance device.

16. The system as defined in claim 15 and further including a circuit board for supporting components of said circuit means including said photo resistance device, and a container supporting said circuit board and said housing relative to one another such that said photo resistance device extends into said second aperture of said housing.

17. A speed monitoring circuit comprising:
means for generating electrical signals whose frequency is directly related to the speed of a moving object;
a direct voltage source;
a charge storage device;
means coupling said charge storage device to said direct voltage source to charge said device continuously with current from said direct voltage source and at a selectable rate;
voltage responsive switch means including a control element coupled to said generating means and responsive to signals therefrom to be actuated to conduct, said switch means coupled to said charge storage device to discharge said device when the conduction path of said switch is completed; and
circuit means coupled to said charge storage device and actuated by a predetermined voltage developed across said device during the period of time between successive periods of non-conduction of said voltage responsive switch to provide an output signal when the frequency of signals from said generating means falls below a predetermined value, thereby allowing the voltage across said charge storage device to exceed a predetermined value.

18. A circuit as defined in claim 17 wherein said generating means includes a continuous source of light and light chopping means, said light chopping means being mechanically coupled to a moving object such that the rate of chopping of said light from said light source is directly related to the speed of said moving object.

19. A circuit as defined in claim 18 wherein said generating means further includes light intercepting means comprising a light responsive device positioned to receive pulses of light developed by said light chopping means.

20. A circuit as defined in claim 10 wherein said light responsive device comprises a photo-resistance cell whose resistance value varies when light is directed upon a light responsive surface thereof.

* * * * *

PO-1050
(5/69)

UNITED STATES PATENT OFFICE
CERTIFICATE OF CORRECTION

Patent No. __3,780,297__  Dated __December 18, 1973__

Inventor(s) __Fred Geary__

It is certified that error appears in the above-identified patent and that said Letters Patent are hereby corrected as shown below:

Column 9, line 21:

After "conduct", delete "and" and insert --- to provide a discharge path for discharging ---.

Column 10, line 57:

"10" should be --- 19 ---.

Signed and sealed this 9th day of April 1974.

(SEAL)
Attest:

EDWARD M. FLETCHER, JR.
Attesting Officer

C. MARSHALL DANN
Commissioner of Patents